United States Patent [19]

Esposito et al.

[11] Patent Number: 4,935,178
[45] Date of Patent: Jun. 19, 1990

[54] METHOD OF MAKING REFRACTORY FIBER PRODUCTS

[75] Inventors: Arthur N. Esposito; Peter A. Wolter, both of Elgin, Ill.

[73] Assignee: General Signal Corporation, Stamford, Conn.

[21] Appl. No.: 878,068

[22] Filed: Jun. 24, 1986

[51] Int. Cl.⁵ ............................................. C04B 33/28
[52] U.S. Cl. ....................................... 264/56; 264/63; 264/71; 264/86; 264/87
[58] Field of Search ................... 264/87, 86, 71, 56, 264/63

[56] References Cited

U.S. PATENT DOCUMENTS 3,216,841  11/1965  Thellmann ............................. 264/86
3,500,444   3/1970  Hesse et al. ........................... 219/544
4,117,055   9/1978  Alexanderson ......................... 264/71

FOREIGN PATENT DOCUMENTS 2215403  12/1972  Fed. Rep. of Germany ........ 264/86

OTHER PUBLICATIONS

Baer et al., In Vitro Degradation of a Ceramic-Ceramic Composite, in Ceramic Bulletin, vol. 57, No. 2 (1978).

Primary Examiner—James Derrington
Attorney, Agent, or Firm—Burmeister, York, Palmatier & Zummer

[57] ABSTRACT

The method of molding a ceramic product by forming a mixture of ceramic fibers with lengths less than one-fourth inch, water and a deflouculent, the mixture having a consistency which will not flow, placing the mixture in a water-absorbing mold, vibrating the mold to cause the mixture to flow into contact with the mold and eliminate voids in the mixture, allowing a portion of the water of the mixture to be absorbed by the mold leaving a hardened remnant in the mold, removing the hardened remnant from the mold, and heating the hardened remnant to sinter the fibers therein to each other. In one example, granular alumina is mixed with the mass of fibers, water and the deflouculent to form the mixture.

10 Claims, 1 Drawing Sheet

METHOD OF MAKING REFRACTORY FIBER PRODUCTS

The present invention relates generally to molded ceramic products and to the methods for making such products. More specifically, the present invention relates to fiber ceramic products and to methods of molding such products.

INTRODUCTION

Prior to the present invention, ceramic products have been molded of various granular ceramic materials utilizing a plaster mold. In this commercially used process, granular particles are mixed with as little water as possible to produce a mixture with a pudding consistency, and this mixture is placed within a recess in a plaster mold. The mixture does not contain sufficient water to permit the mixture to flow against the walls of the mold, and the mold is vibrated to cause the mixture to flow, thereby removing air pockets and causing the mixture to engage the walls of the recess in the mold. Moisture from the mixture is absorbed in the plaster of the plaster mold, and after a period of time, the mixture hardens to provide a green product, that is, a product which has sufficient strength to hold its shape after removal from the mold. The green product is then heated to sinter the ceramic granules to each other to provide a durable, solid ceramic product.

Products produced in this manner are highly stable and may be utilized at elevated temperatures. However, the material of the product is dense, making the products heavy. Hence, it is desirable to reduce the density of the ceramic product produced in the manner indicated above in order to produce a lighter product without sacrificing strength.

It is also known that light weight silica products may be produced with silica fibers. As disclosed in U.S. Pat. No. 3,500,444, issued to W. K. Hesse, et al. on Mar. 10, 1970, entitled, ELECTRICAL HEATING UNIT WITH AN INSULATING REFRACTORY SUPPORT, the ceramic fibers are filter molded from a dilute water suspension. In an example, Hesse sets forth a suspension which is 99 % water and 1 % solids, the solids including a binder, as well as the fibers. The resulting product is a product of low density, Hesse indicating a range of about 4 to about 30 pounds per cubic foot. In the process of Hesse, a large portion of the water of the suspension is removed from the mat by draining the water through a screen, the mat collecting on the screen. In practice, additional water is removed by applying pressure to the mat, and also vacuum is applied below the screen to facilitate the removal of water. The patent application of Duane L. Sterwald, entitled METHOD OF MAKING THERMAL INSULATING BLOCKS AND ELECTRICAL HEATING UNITS AND THE PRODUCTS THEREOF, Serial No. 868651, filed May 30, 1986, assigned to the assignee of the present applicant, discloses vibrating the mold to facilitate removal of water from the mat.

To the knowledge of the present inventors, there is no process for commercial production known prior to the present invention for producing molded ceramic fiber products with densities greater than those of vacuum formed ceramic fiber products and less than molded granular silica products, that is products having densities between approximately 30 pounds per cubic foot and 150 pounds per cubic foot, without the use of excess binders and/or further fabrication. It is an object of the present invention to provide a process for molding ceramic fiber products having densities in this range.

Also, to the knowledge of the present inventors, fiber ceramic products have not been made heretofore by casting using a plaster cast. Prior to the present invention, the requisite randomness of the ceramic fibers was obtained by suspending the fibers in a body of water. Products produced by casting methods generally are less costly to produce and can be shaped in the casting process to eliminate machining. It is an object of the present invention to provide a process for casting fiber ceramic products utilizing a water absorbing cast.

The low density composition of ceramic fiber products produced by known methods requires a binder to hold the fibers together during the processing of the product. In the absence of a binder, the mat produced by the filter molding process contains fibers which are in abutment with each other, but without adequate green stength to maintain the shape of the mat between the steps of removing the mat from the mold and sintering the mat. To overcome the lack of green strength, a binder is incorporated in the dilute suspension of fibers and water. On sintering, however, the binder becomes unnecessary, and further, under some conditions, tends to deteriorate the fibers. It is therefore an object of the present invention to provide a fiber ceramic product which does not include a binder.

THE INVENTION

The present inventors have found that a water absorbing mold may be utilized to produce molded fiber ceramic products, provided: (1) the amount of water utilized in the mixture inserted into the water absorbing mold is sufficiently small that the mold can absorb the water, (2) the fibers are relatively short and of uniform cross-section so that the fibers will mix with the small amount of water present in a uniform manner, and (3) that a dispersing agent or deflocculent be utilized in the mixture with the water and the fibers to assure good contact between the water and the fibers. In addition, it is necessary in many cases to provide some means for retarding the rate at which water is absorbed in the water absorbent mold.

The present invention requires a substantially uniform mixture of short ceramic fibers, a small quantity of water and a deflocculent. The mixture is worked into the recess of a water absorbing mold and caused to flow into contact with the walls of the mold by means of vibration. Thereafter the mold absorbs water from the mixture and reduces the quantity of water sufficiently to allow the friction between abutting fibers to provide sufficient green strength to permit removal of the molded product from the mold. The product is removed from the mold, dried, and thereafter placed in an oven and sintered.

Products produced by this process are unique in that they may be cast with densities between 30 pounds per cubic foot and 150 pounds per cubic foot, and the invention includes products made by the process described above and the products themselves.

DESCRIPTION OF THE DRAWINGS

The present invention will be more fully understood with reference to the attached drawings in which.

DETAILED DESCRIPTION OF THE INVENTION

The apparatus for carrying out the present invention is illustrated in the figures. A mold of the type used for slip casting or thixotropic casting of ceramic products is shown at 10. Such molds are constructed of water absorbing materials, such as plaster of paris, and the mixture of ceramic material and water placed in such a mold contains sufficiently small quantities of water that the absorption of the water from the mixture in the walls of the mold permits the ceramic material in the mold to harden.

Figure 1:
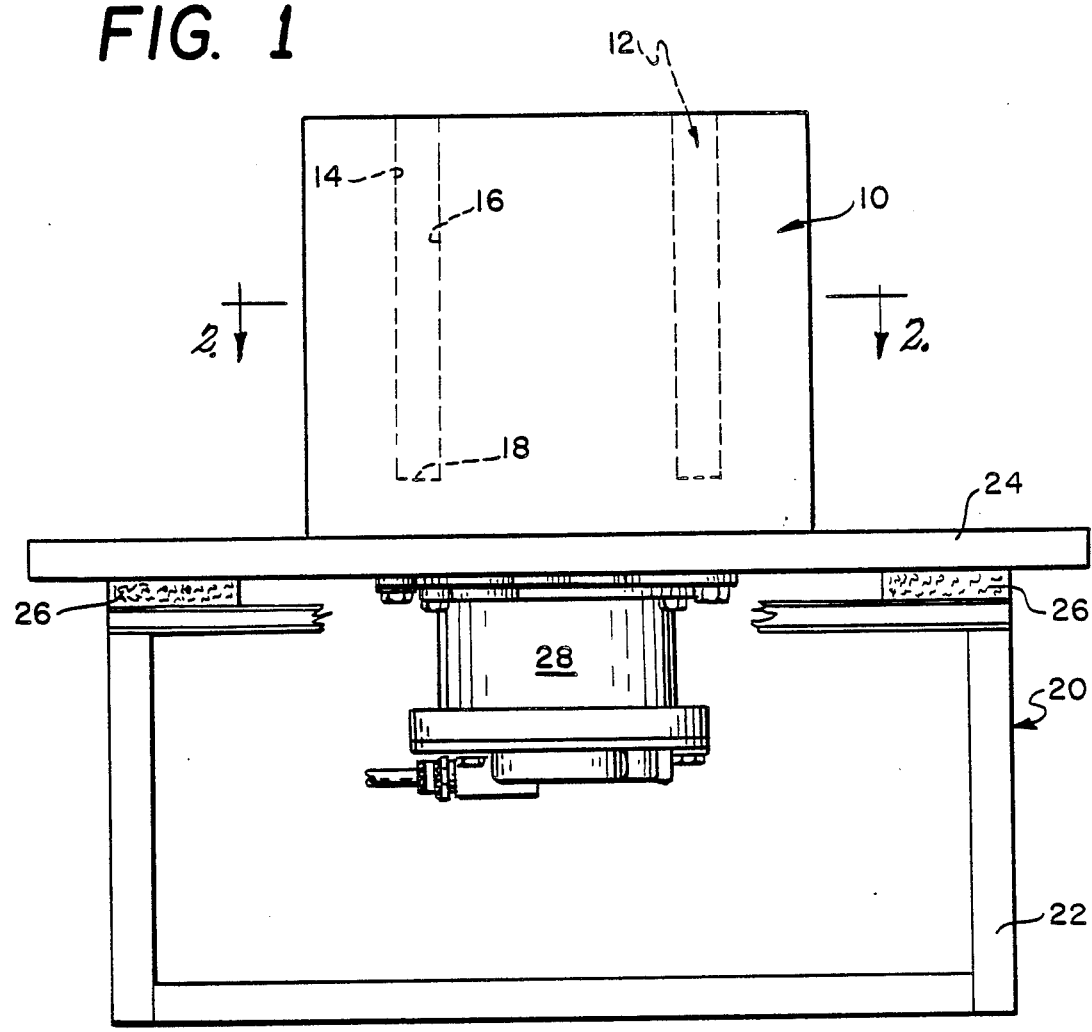
FIG. 1 is a front elevational view of the molding equipment utilized in carrying out the processes of the present invention and in making the products of the present invention.
Figure 2:
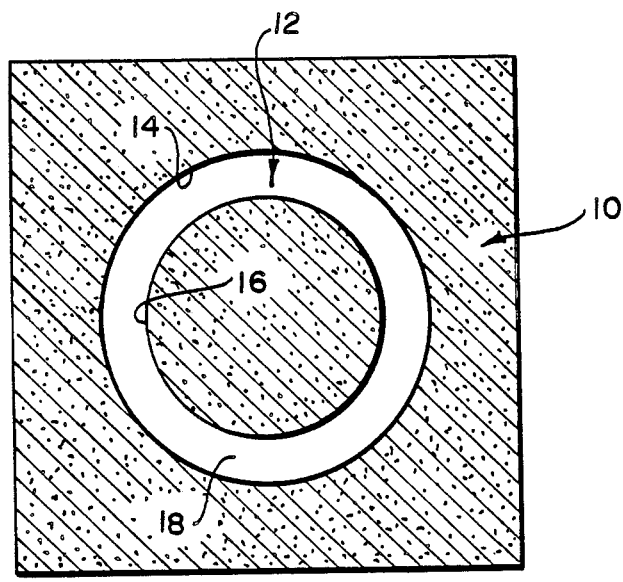
FIG. 2 is a sectional view of the mold taken along the line 2—2 of FIG. 1.

The mold 10 contains a recess 12 shaped to form the desired product, and in the illustration of FIGS. 1 and 2, the recess 12 is shaped to form a cylindrical tube. The recess 12 has a cylindrical outer wall 14 and cylindrical inner wall 16. In addition, the recess has a circular bottom wall 18.

The mold 10 rests upon a vibration table 20 which is provided with a frame 22 supporting a table top 24 through a plurality of compliant spacers 26 disposed at intervals about the perimeter of the table 24. A vibrator 28 is mounted on the underside of the table top 24, and operation of the vibrator 28 causes the table top 24 to vibrate with respect to the frame 22.

To cast a product with ceramic fibers, a mixture of ceramic fiber and water is prepared. In order to produce a physically strong ceramic body, it is necessary for the fibers to be randomly distributed throughout the body, and accordingly, the fibers must be randomly distributed in the mixture. If the fibers are too long, they will tend to ball, or otherwise become aligned, and accordingly, the fibers must be relatively short. Further, if fibers are relatively long, the fibers will pack less densely in the mold. The inventors have found that the length of the ceramic fibers should not exceed ¼ inch on average.

Ceramic fibers are produced under high temperature, and generally are provided with balls or shot at the ends thereof. The presence of balls at the ends of the fibers adversely affects the distribution of the fibers in the mold, and fibers should be processed to remove the balls from the fibers and the balls discarded prior to mixing the fibers with water. The cross section of the fibers should be uniform with respect to each other and with respect to the length of the fibers in order to promote high density products.

The fibers contain high refractory compositions, such as silica, alumina, zirconia, alumina-silica compositions, including those alumina-silica compositions containing titania and/or zirconia, and synthetically produced inorganic fibers which exhibit resistance to deterioration in temperatures up to the order of 2000° F. to 4000° F. Such fibers are more fully described in an article entitled "Critical Evaluation of the Inorganic Fibers" in Product Engineering, Aug. 3, 1964, pages 96 through 100. Suitable fibers are available commercially and include FIBERMAX and FIBERFRAX available from the Carborundum Company, ZIRCAR zirconia fibers available from Zircar Products, Inc., SAFFIL or KAO-WOOL ceramic fibers available from Babcock and Wilcox Company. Such fibers have diameters ranging from approximately 2 to approximately 6 microns and are relatively uniform throughout the lengths of the fibers. The shot or ball content should not exceed 25% of the total by weight.

The fibers are mixed with water using a low intensity mixer to produce a uniform distribution of fibers within the mixture. There must be sufficient water present to fill all voids between fibers, but as little water as possible should be used in the mixture, since the water must be absorbed in the mold in order to permit the ceramic product to harden. Because of the fact that the density of fiber ceramic products is significantly lower than that of granular ceramic products, considerably more water is utilized in the mixture containing fibers as a percentage of the total. The amount of water necessary in the mixture should be just sufficient to permit the mixture to flow under vibration, but not flow in the absence of vibration, as in conventional thixotropic casting processes.

It is necessary to provide a dispersing agent in the mixture to make certain that contact is made with all portions of the ceramic fiber. Dispersing agents are available commercially, and DARVAN #7 distributed by R. T. Vanderbilt Company, Inc. has proven to be satisfactory.

The mold must contain a sufficient mass to absorb the water from the mixture inserted in the recess of the mold. One suitable material for the mold is plaster of paris which is a dehydrated gypsum. The water content of the mixture is approximately equal to that of the fibers by weight. Thixotropic casting of granular ceramics is achieved using up to approximately 15% water and 85% granular material, and hence the present process requires the mold to absorb more than six times the amount of water used by the prior art thixotropic casting process.

The fact that such a relatively large quantity of water must be transferred from the mixture in the recess of the mold to the mold extends the time for hardening of the green product, and also increases the likelihood of nonuniform transfer of water to the mold, thus leaving wet regions in the green product which may not have adequate green strength.

It is desirable to retard the flow of moisture from the mixture in the recess of the-mold in order to obtain a more uniform distribution of the mixture in the mold and the moisture in the product. For this purpose, a water retardant is mixed with the mixture of fibers and water. Alginates have proven to be satisfactory for this purpose. Sodium alginate and ammonium alginate have proven to be particularly suitable, and have the effect of providing a skin on the wall of the plaster mold to produce a smooth product. Sodium or ammonium alginate is mixed with the water and fiber prior to placing the mixture in the mold. The alginates may be omitted from the mixture, and the mold coated with polyvinyl alcohol as an alternative.

The process for producing a sintered ceramic product starts with the preparation of the liquid component of the mixture, namely mixing together water, the flow retardant in a range of 0.5 to 4 grams per 1000 cubic centimeters of water, and the dispersing agent in a range of 0.5 to 4 cubic centimeters per 100 cubic centimeters of water. Thereafter, a mass of fibers of proper length and uniformity is placed in a mixing bowl and a quantity of the liquid component is added to the fibers and mixed with the fibers in the mixing bowl. If desired, the solid component may include refractory ceramic powders, such as silica or alumina, as well as ceramic fibers, thereby increasing the density of the product. Additional liquid component is added until the mixture of fibers and liquid component has a pudding consistency, that is, a consistency which will not flow except under mechanical agitation.

Thereafter the mixture of fibers and liquid component is transferred by hand into the recess of the mold, and the vibrator is placed in operation to make the mixture of liquid component and fibers sufficiently flowable to obtain good contact with the walls of the recess in the mold. When the recess is filled, and all air pockets have been removed and good contact is achieved with the walls of the mold, the vibrator is turned off. The mixture in the recess of the mold is then allowed to harden. After a period of time, the mixture will become sufficiently hard that actuation of the vibrator will not cause the mixture to become fluid. At this time the product has sufficient green strength to be removed from the mold and permitted to air dry. The product may also be dried in a low temperature oven if desired.

Thereafter, the green product is placed in an oven and the temperature raised sufficient to cause sintering of the fibers. The fibers become attached to each other at the points of contact in the product, thus forming a strong rigid body.

The following are specific examples of products produced according to the present invention. 290 grams of ceramic fibers consisting of 95 % $AL_2O_3$ and 5 % $SIO_2$ obtained from Babcock & Wilcox Company under the name SAFFIL were chopped to less than ¼ inch in average length. The liquid component of the slurry was made up by mixing 2 grams of ammonium alginate obtained from TIC Gums Inc. with 1000 cubic centimeters of water and mixing therewith 5 cubic centimeters of a polyelectrolyte dispersing agent in an aqueous solution known as DARVAN No. 7 obtained from R. T. Vanderbilt Company, Inc. The fiber component was placed in a low intensity mixer and 320 cubic centimeters of the liquid component was added to the fiber component and mixed for 13 minutes to form a pudding consistency. The mix was then hand fed into a tile mold for producing a tile ½ inch thick by 2 inches high by 9 inches long made with pottery plaster obtained from Georgia Pacific Co. under the tradename K-60. After one hour the green product was removed from the mold and permitted to air dry for a period of about 24 hours. The green product was then fired in a furnace at 1560° C. for 3 hours. The finished product had a density of 63 pounds per cubic foot.

An example of a refractory fiber ceramic product which includes refractory powders is as follows. The liquid component of the mixture was first prepared by mixing 2 grams of ammonium alginate per 1000 cubic centimeters of water, and a dispersant such as DARVAN No. 7 in the amount of 2 cubic centimeters per 100 cubic centimeters of water. Fibers obtained from Carborundum Company under the trademark FIBERFRAX and chopped to an average length of approximately ½ inch and processed so that the shot content was less than 25 % were mixed with a refractory powder in the form of Alcoa Chemical Division's T-64 tabular alumina (−325 mesh) in equal proportions by weight. 400 grams of the dry mixture of tabular alumina and fibers was then placed in a mixing bowl, and the liquid component was added to the dry component and admixed in the mixing bowl to produce a pudding consistency. The mixture was then hand fed into a plaster mold, and the mold was subjected to vibration until the mold was full and air pockets were removed from the mold. The vibration was stopped and the mold was allowed to absorb enough water from the mixture so that further vibration would not cause the mixture to become fluid.

Thereafter, the product was stripped from the mold and the product was permitted to air dry for a period of 24 hours. The air dried product was then placed in a furnace at 2450° Fahrenheit for a period of 4 hours to sinter. The product had a density of 70 pounds per cubic foot.

In both examples, the vibrator operated at a frequency of 60 cycles. The agitation of the mixture in the mold is only required to make the mixture fluid enough to fill the mold and to remove air pockets from the mold. The process is not sensitive to the frequency of the vibration and the vibration need only be sufficient to cause the mixture to become fluid.

Likewise, the mixer utilized to mix the liquid component and the dry component of the mixture is not critical. Mixers manufactured by Hobart Manufacturing Company for kitchen use, such as the Kitchenaid Model K-45 or Hobart Model A-200 have proven to be satisfactory.

Products produced by the process described above have considerably lower densities than ceramic products produced by the casting process using aggregate ceramic materials, but higher densities than those produced by the vacuum forming method using ceramic fibers. Further, the density of the product produced under the present invention may be controlled more readily than fiber ceramic products produced by the filter method. In addition, the density of products produced under the present invention extend over a range of densities lying generally between the density of filter formed fiber ceramic products and the density of ceramic products produced by the thixotropic casting process. Further, products produced according to the present invention can be expected to have longer life than the fiber ceramic products requiring a binder.

The present invention permits the production of lower density products than can be produced by the thixotropic casting method, thus requiring less energy for sintering and reducing the quantity of ceramic materials in the product from that required by the thixotropic casting process. Likewise, the present invention permits the use of a plaster mold casting process for fiber ceramic products which is significantly less costly than a vacuum filtering fiber ceramic process, both in the elimination of the need for a vacuum and in the energy required to dry the green product.

Those skilled in the art will devise many processes, products, and uses for the present invention over and above those here disclosed. It is therefore intended that the scope of the present invention be not limited by the foregoing specification, but rather only by the appended claims.

The invention claimed is:

1. The method of making a ceramic produce comprising the steps of mixing a mass of ceramic material limited to the class consisting of ceramic fibers and granulated alumina and including ceramic fibers with a mass of water and a deflocculent to form a mixture, the fibers in the mixture having average lengths less than one-fourth inch and substantially uniform cross sections, the mixing continuing until the ceramic fibers are substantially uniformly distributed throughout the mixture and oriented substantially randomly with respect to each other the ratio of water to ceramic material int eh mixture being less than required to provide a mixture consistency which will flow, thereafter placing the mixture into the recess of a mold constituted of liquid absorbent material, thereafter subjecting the mold to vibration to cause the mixture to flow into contact with the mold and to eliminate voids in the mixture, thereafter, maintaining the mold and mixture at rest for a period of time sufficient to allow a large portion of the water from the mixture to become absorbed in the mold to permit the mixture remnant remaining in the recess to harden, thereafter removing the mixture remnant from the mold, and thereafter heating the mixture remnant to sinter abutting fibers to each other.

2. The method of making a ceramic product comprising the steps of claim 1 including the step of retarding the flow of water from the mixture into the mold.

3. The method of making a ceramic product comprising the steps of claim 2 wherein the flow of water into the mold is retarded by admixing an alginate with the mass of fibers, deflocculent and water. with an alginate.

4. The method of making a ceramic product comprising the steps of claim 3 wherein the alginate is ammonium alginate.

5. The method of making a ceramic product comprising the steps of claim 2 wherein the flow of water into the mold is retarded by coating the walls of the mold with polyvinyl alcohol.

6. The method of making a ceramic product comprising the steps of claim 1 wherein the mass of the water in the mixture comprises a mass of the same order of magnitude as the mass of the ceramic content of the mixture placed into the mold.

7. The method of making a ceramic product comprising the steps of claim 1 wherein the mold is produced of plaster of paris.

8. The method of making a ceramic product comprising the steps of claim 1 wherein the fibers have cross sections between 2 and 6 microns.

9. The method of making a ceramic product comprising the steps of claim 1 in combination with the step of mixing granular ceramic particles with the ceramic fibers, water and deflocculent before placing the mixture in the mold.

10. The method of making a ceramic product comprising the steps of claim 9 wherein the granular ceramic particles comprise tabular alumina.

* * * * *

UNITED STATES PATENT AND TRADEMARK OFFICE
CERTIFICATE OF CORRECTION

PATENT NO. : 4,935,178
DATED : June 19, 1990
INVENTOR(S) : Arthur N. Esposito; Peter A. Wolter It is certified that error appears in the above-identified patent and that said Letters Patent is hereby corrected as shown below:

Column 6, line 59, delete "produce" and insert
        ---product---.

Column 7, line 1, delete "int eh" and insert
        ---in the---;
            line 21, delete "with an alginate."

Signed and Sealed this

Twentieth Day of August, 1991

Attest:

HARRY F. MANBECK, JR.

*Attesting Officer*   Commissioner of Patents and Trademarks